United States Patent
Yoshizaki et al.

(10) Patent No.: US 10,063,728 B2
(45) Date of Patent: Aug. 28, 2018

(54) INFORMATION PROCESSING APPARATUS, IMAGE READING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Akane Yoshizaki, Kanagawa (JP); Shigeru Okada, Kanagawa (JP); Katsuya Koyanagi, Kanagawa (JP); Kunihiko Kobayashi, Kanagawa (JP); Shintaro Adachi, Kanagawa (JP); Hiroyuki Kishimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/134,946

(22) Filed: Apr. 21, 2016

(65) Prior Publication Data
US 2017/0180581 A1    Jun. 22, 2017

(30) Foreign Application Priority Data
Dec. 22, 2015   (JP) ................................ 2015-249541

(51) Int. Cl.
H04N 1/04    (2006.01)
H04N 1/00    (2006.01)
G06K 7/10    (2006.01)

(52) U.S. Cl.
CPC ..... *H04N 1/00822* (2013.01); *G06K 7/10544* (2013.01); *H04N 1/00968* (2013.01)

(58) Field of Classification Search
CPC ....................... H04N 1/00822; H04N 1/00968
USPC ............................. 358/1.13, 1.14, 1.15, 1.9
See application file for complete search history.

(56) References Cited

U.S. PATENT DOCUMENTS

| | | | |
|---|---|---|---|
| 5,871,288 A * | 2/1999 | Ryan, Jr. ................ | G06K 5/00 400/103 |
| 2007/0176001 A1* | 8/2007 | Cattrone ................ | G06K 19/08 235/462.01 |
| 2007/0195337 A1* | 8/2007 | Takayama .............. | G06K 15/02 358/1.2 |
| 2012/0127541 A1* | 5/2012 | Kishida .............. | H04N 1/00228 358/474 |
| 2013/0051692 A1* | 2/2013 | Kakutani ........... | H04N 1/32133 382/233 |
| 2013/0215475 A1* | 8/2013 | Noguchi ............ | H04N 1/32106 358/448 |
| 2015/0373220 A1* | 12/2015 | Koizumi ........... | H04N 1/32144 358/448 |

FOREIGN PATENT DOCUMENTS

JP    2006-092388 A    4/2006

* cited by examiner

*Primary Examiner* — Houshang Safaipour
(74) *Attorney, Agent, or Firm* — Oliff PLC

(57) ABSTRACT

An information processing apparatus includes an acquisition unit and an output unit. The acquisition unit acquires a read image obtained by an image reading unit by reading at least a formation portion of a document to which a code image has been affixed, the code image being formed. The output unit outputs at least one of a recommended formation condition, which is a recommended condition used when the code image is formed on the document, and a recommended reading condition, which is a recommended condition used when the image reading unit reads the formation portion, on the basis of the read image acquired by the acquisition unit.

10 Claims, 7 Drawing Sheets

FIG. 4

| MODEL NUMBER | NUMBER OF CHARACTERS [CHARACTERS] | | RECOMMENDED VALUE OF SIZE [mm OR MORE] | | | |
|---|---|---|---|---|---|---|
| | ALPHANUMERIC MODE | KANJI MODE | READING RESOLUTION | | | |
| | | | 200 dpi | 300 dpi | 400 dpi | 600 dpi |
| 14 | 528 | 223 | 64.8 | 43.2 | 32.4 | 21.6 |
| 15 | 600 | 254 | 67.9 | 45.3 | 34.0 | 22.7 |
| 16 | 656 | 277 | 70.9 | 47.3 | 35.5 | 23.7 |

INFORMATION PROCESSING APPARATUS, IMAGE READING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-249541 filed Dec. 22, 2015.

BACKGROUND

Technical Field

The present invention relates to an information processing apparatus, an image reading apparatus, an information processing method, and a non-transitory computer readable medium.

SUMMARY

According to an aspect of the present invention, there is provided an information processing apparatus including: an acquisition unit that acquires a read image obtained by an image reading unit by reading at least a formation portion of a document to which a code image has been affixed, the code image being formed in the formation portion; and an output unit that outputs at least one of a recommended formation condition, which is a recommended condition used when the code image is formed on the document, and a recommended reading condition, which is a recommended condition used when the image reading unit reads the formation portion, on a basis of the read image acquired by the acquisition unit.

BRIEF DESCRIPTION OF THE DRAWINGS

An exemplary embodiment of the present invention will be described in detail based on the following figures, wherein:

FIG. 4 illustrates a recommended value database stored in a memory;

DETAILED DESCRIPTION

An exemplary embodiment of the present invention will be described in detail below with reference to the accompanying drawings.

Figure 1:
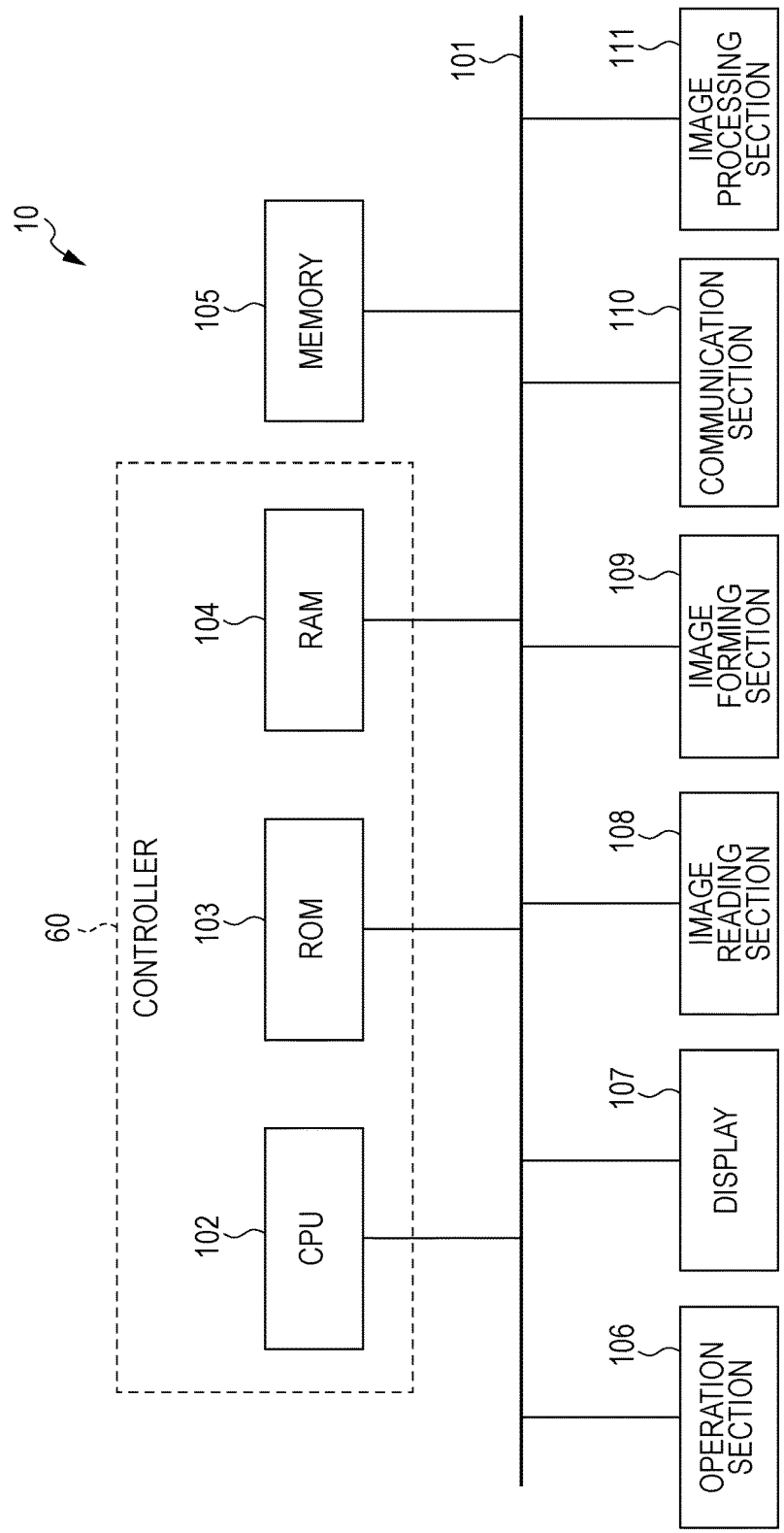
FIG. 1 illustrates an image forming apparatus according to an exemplary embodiment.

FIG. 1 illustrates an image forming apparatus 10 according to an exemplary embodiment.

As illustrated in FIG. 1, functional sections that compose the image forming apparatus 10 according to the exemplary embodiment are connected to a bus 101, and exchange data via the bus 101.

An operation section 106 receives an operation by a user. The operation section 106 is constituted of hardware keys, for example. Alternatively, the operation section 106 is constituted of a touch screen that outputs a control signal that matches a pressed position, for example.

A display 107 is constituted of a liquid crystal display, for example, and displays data on the image forming apparatus 10 under control by a central processing unit (CPU) 102. In addition, the display 107 displays a menu screen to be referenced by the user when the user operates the image forming apparatus 10.

An image reading section 108 is constituted of a so-called scanner device, and reads an image on a document set on the image reading section 108 and generates a read image (image data).

An image forming section 109 forms a toner image that matches the image data on paper using an electrophotographic system, for example. The image forming section 109 may form an image using a different system such as an inkjet head system.

A communication section 110 is connected to a communication line (not illustrated), and functions as a communication interface for communication with a different device connected to the communication line.

An image processing section 111 performs image processing such as color correction and tone correction on an image represented by the image data.

A memory 105 is constituted of a storage device such as a hard disk device, and stores data received by the communication section 110 and the read image generated by the image reading section 108, for example. Further, the memory 105 stores a recommended value database (to be discussed later).

A controller 60 controls the various components of the image forming apparatus 10. The controller 60 is composed of the CPU 102, a read only memory (ROM) 103, and a random access memory (RAM) 104.

The ROM 103 stores a control program to be executed by the CPU 102. The CPU 102 reads the control program stored in the ROM 103, and executes the control program using the RAM 104 as the working area.

When the control program is executed by the CPU 102, the various components of the image forming apparatus 10 are controlled by the CPU 102, and the image forming apparatus 10 forms an image on paper and reads a document to generate a read image of the document, for example.

Figure 2:
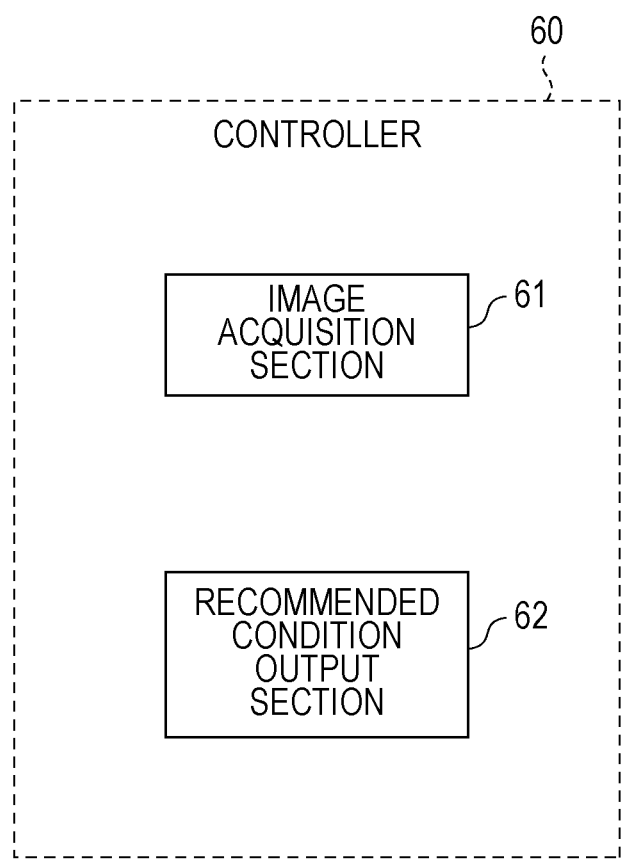
FIG. 2 is a block diagram illustrating the functional configuration of a controller.

In the exemplary embodiment, in addition, when the control program is executed by the CPU 102, as illustrated in FIG. 2 (a block diagram that illustrates the functional configuration of the controller 60), the controller 60 functions as an image acquisition section 61 and a recommended condition output section 62.

In the exemplary embodiment, a portion provided with the image acquisition section 61 and the recommended condition output section 62 may be considered as an information processing apparatus that performs a process for reading a code image.

In addition, a portion for the image reading section 108 (see FIG. 1) and the controller 60 may be considered as an image reading apparatus that reads a document and outputs a recommended condition on the basis of the reading result.

The image acquisition section 61 and the recommended condition output section 62 are implemented through cooperation between software and hardware resources.

Specifically, in the exemplary embodiment, the ROM 103 (see FIG. 1) and the memory 105 store an operating system, application software executed in conjunction with the operating system, and so forth. In the exemplary embodiment, the CPU 102 loads such programs from the ROM 103 or the like into the RAM 104 which is a principal storage device, and executes the programs to implement the functional components, namely the image acquisition section 61 and the recommended condition output section 62.

The programs executed by the CPU 102 may be provided to the image forming apparatus 10 as recorded in a computer-readable recording medium such as a magnetic recording medium (such as a magnetic tape and a magnetic disk), an optical recording medium (such as an optical disc), a magneto-optical recording medium, and a semiconductor memory.

Alternatively, the programs executed by the CPU 102 may be downloaded to the image forming apparatus 10 using a communication unit such as the Internet.

Figure 3:
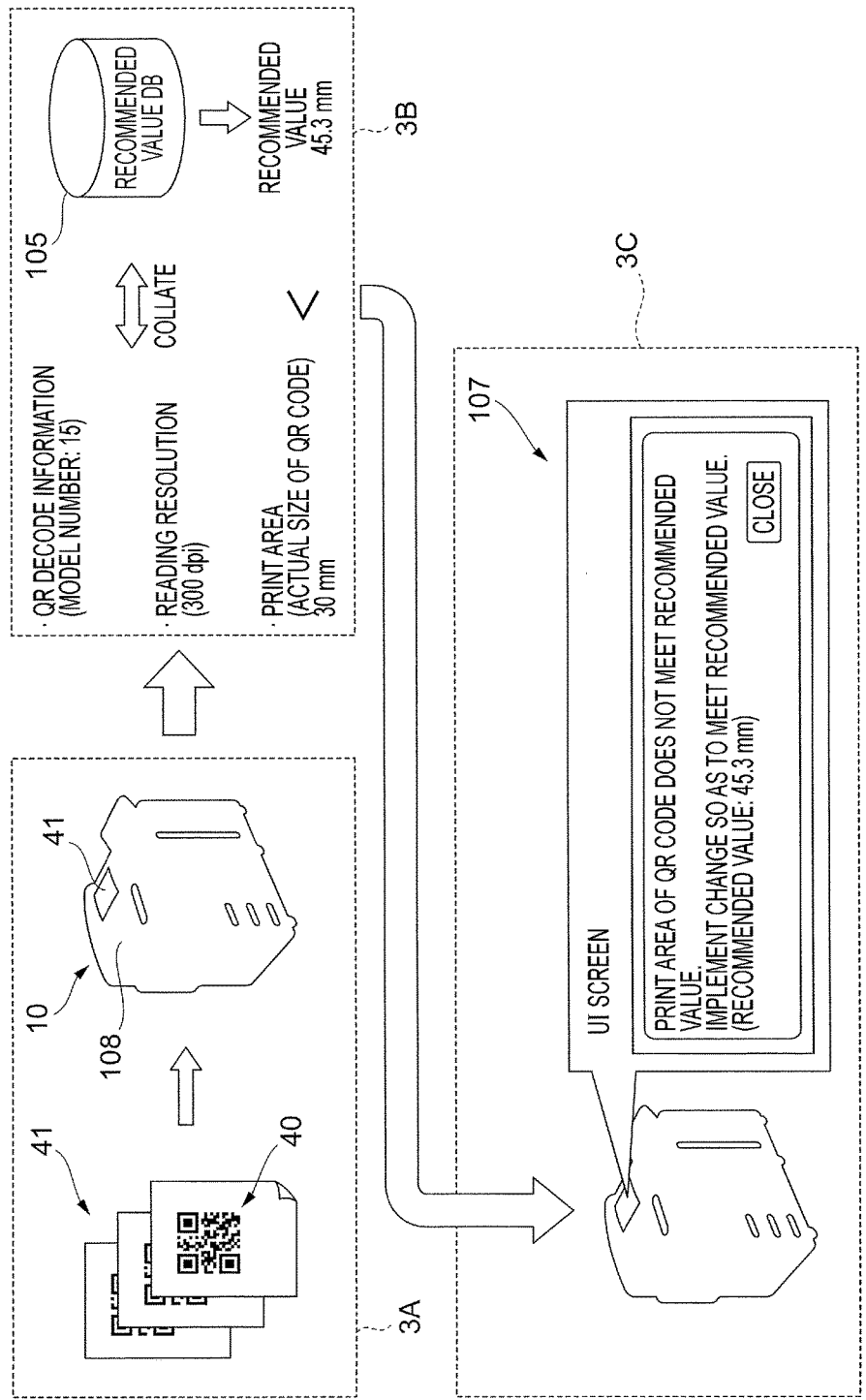
FIG. 3 illustrates a specific example of a process performed in the exemplary embodiment.

FIG. 3 illustrates a specific example of a process performed in the exemplary embodiment.

In the exemplary embodiment, first, a process indicated by symbol 3A is executed.

In the process indicated by symbol 3A, the user sets a document 41 to which a QR code (registered trademark) 40, which is an example of the code image, has been affixed on the image reading section 108 which is an example of the image reading unit, and reads the document 41. Consequently, a read image of the document 41 is obtained.

Although the QR code 40 is used as an example of the code image in the exemplary embodiment, a different type of two-dimensional barcode may also be used. Alternatively, a one-dimensional barcode may also be used.

In the exemplary embodiment, then, a process indicated by symbol 3B is executed.

In the process indicated by symbol 3B, first, the image acquisition section 61 which is an example of the acquisition unit acquires the read image obtained by the image reading section 108.

Then, the recommended condition output section 62 which is an example of the output unit analyzes (decodes) the QR code 40 included in the read image acquired by the image acquisition section 61, and grasps the model number (version) of the QR code 40.

More specifically, the recommended condition output section 62 counts the number of cells that compose the QR code 40, and grasps the model number of the QR code 40 on the basis of the counting result.

In the example, a model number of "15" is grasped.

Further, the recommended condition output section 62 grasps the reading condition used when the image reading section 108 has read the document 41. Specifically, the recommended condition output section 62 grasps the reading resolution used when the image reading section 108 has read the document 41.

In the example, a reading resolution of "300 dpi" is grasped.

Further, the recommended condition output section 62 analyzes the read image acquired by the image acquisition section 61, and obtains the size (actual size of the print area) of the QR code 40 included in the read image.

In the example, the length (30 mm) of one side of the QR code 40 is grasped as the size of the QR code 40.

The model number of the QR code 40 indicates the type of the QR code 40, and a number from 1 to 40 is set as the model number, for example. The number of cells in the QR code 40 is determined for each model number.

As the model number is smaller, the number of cells is smaller, and the QR code 40 is smaller. Meanwhile, as the model number is larger, the number of cells is larger, and the QR code 40 is larger.

After that, in the exemplary embodiment, the recommended condition output section 62 determines, on the basis of the information obtained through the process indicated in symbol 3B, whether or not the QR code 40 meets a predetermined condition.

Specifically, the recommended condition output section 62 determines whether or not the QR code 40 included in the read image has a predetermined size or more.

In the exemplary embodiment, in order to make the determination, the recommended condition output section 62 first obtains a recommended value for the size of the QR code 40 on the basis of the model number and the reading resolution obtained as described above and the information stored in the memory 105 (information stored in the recommended value database).

Specifically, the recommended condition output section 62 obtains a recommended value of 45.3 mm or more.

FIG. 4 illustrates the recommended value database stored in the memory 105. In FIG. 4, only a portion for model numbers from 14 to 16 is extracted and illustrated.

The recommended value database stores the model number, the number of characters, and the recommended value for the size of the QR code 40 in a mutually correlated manner.

For example, in the case where the model number is 15, the recommended value for the size of the QR code 40 is one of 67.9 mm or more, 45.3 mm or more, 34.0 mm or more, and 22.7 mm or more.

More specifically, the recommended value for the size of the QR code 40 differs in accordance with the reading resolution used to read the QR code 40, and is 67.9 mm or more when the reading resolution is 200 dpi, 45.3 mm or more when the reading resolution is 300 dpi, 34.0 mm or more when the reading resolution is 400 dpi, and 22.7 mm or more when the reading resolution is 600 dpi.

In the exemplary embodiment, the model number of the QR code 40 included in the read image is "15" as described above. In addition, the reading resolution used when the image reading section 108 read the document 41 is "300 dpi" as described above.

As a result, with reference to FIG. 4, the recommended value for the exemplary embodiment is 45.3 mm or more.

After that, in the exemplary embodiment, the recommended condition output section 62 makes a comparison between the size (actual size) (30 mm) of the QR code 40 included in the read image and the size (45.3 mm) of the QR code 40 obtained as the recommended value.

For an additional description, a comparison is made between the size (actual size) of the QR code 40 included in the read image and the size of the QR code 40 obtained from the recommended value database.

In the case where the actual size is smaller than the recommended value, the recommended condition output section 62 outputs the recommended value for the QR code 40. For an additional description, in the exemplary embodiment, the recommended condition output section 62 outputs the recommended value in the case where the QR code 40 does not meet a predetermined condition.

In the exemplary embodiment, the size (actual size) of the QR code 40 included in the read image is smaller than the size (recommended value) of the QR code 40 obtained from the recommended value database. Therefore, in the exemplary embodiment, the recommended condition output section 62 outputs the recommended value.

In the exemplary embodiment, the value 45.3 mm obtained from the recommended value database is used as the recommended value, and the recommended condition output section 62 outputs the value 45.3 mm as the recommended value.

In the exemplary embodiment, the recommended value (recommended formation condition) (45.3 mm) which has been output is transmitted to the display 107 (see FIG. 1). As indicated by symbol 3C in FIG. 3, the display 107 displays a message saying that it is necessary to change the size of the QR code 40 and the recommended value (45.3 mm) for the size of the QR code 40.

Figure 5:
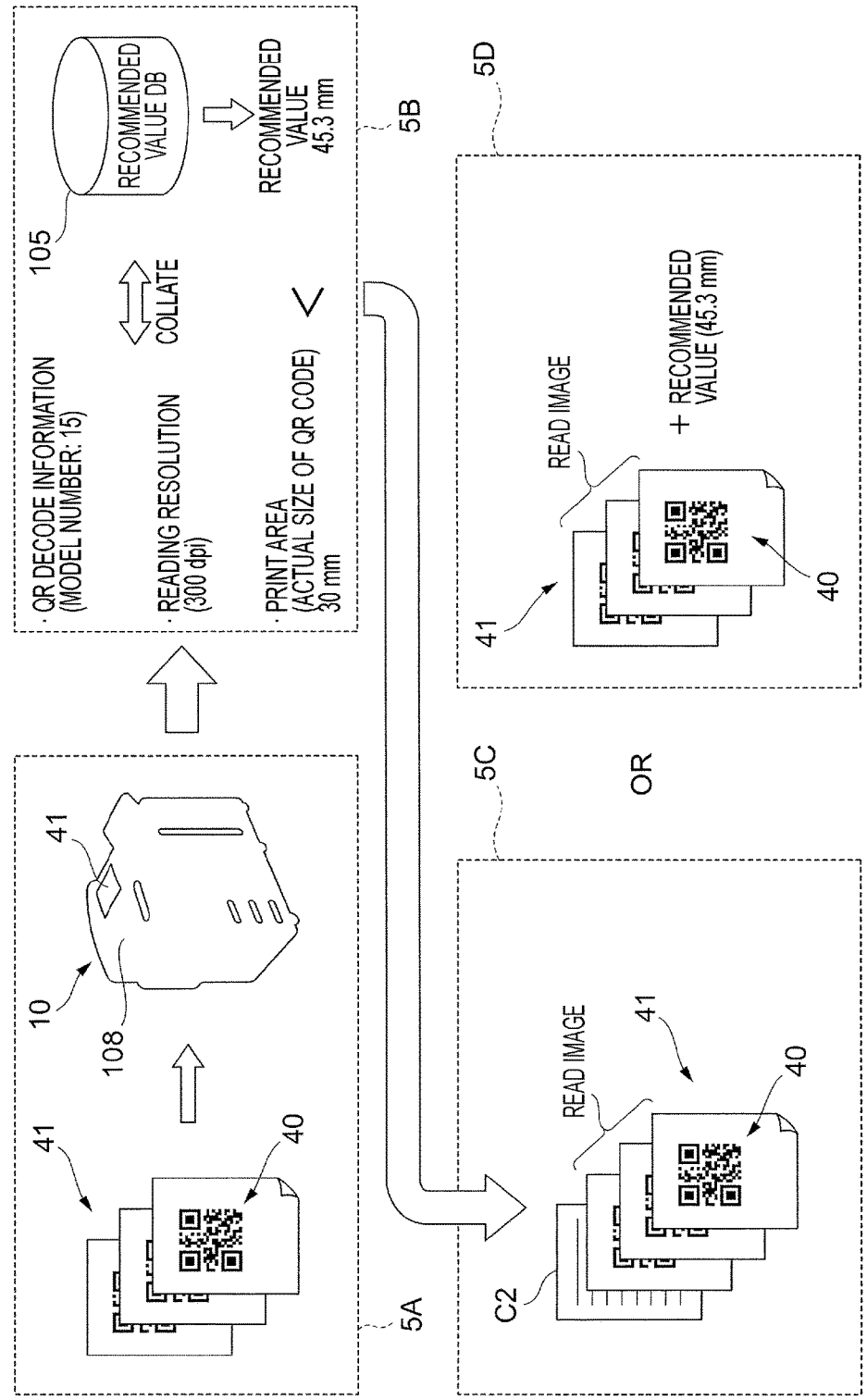
FIG. 5 illustrates another example of the process performed by the image forming apparatus.

FIG. 5 illustrates another example of the process performed by the image forming apparatus 10.

In the process, processes indicated by symbols 5A, 5B, and 5C are executed. The processes indicated by symbols 5A and 5B are the same as the processes indicated by symbols 3A and 3B, and the process indicated by symbol 5C will be described.

In the process indicated by symbol 5C, image data for a page that indicates the recommended value is added to the read image (read data) of the document 41 as indicated by symbol C2.

In other words, in the process, image data used to display the recommended value are generated, and added to the read image of the document 41.

Further, specifically, a page generation section (not illustrated), which is an example of the processing unit, generates image data for a new page that indicates the recommended value output from the recommended condition output section 62, and adds the image data to the read image (read data on the document 41).

Alternatively, a process indicated by symbol 5D may be performed.

In the process indicated by symbol 5D, an attribute information affixation section (not illustrated) affixes the recommended value (45.3 mm) output from the recommended condition output section 62 to the read image of the document 41.

For an additional description, in the process, the recommended value output from the recommended condition output section 62 is used as attribute information on the read image. For a further description, in the process, the recommended value output from the recommended condition output section 62 is correlated with the read image.

Although not illustrated, the recommended value may be printed on paper.

Specifically, the recommended condition output section 62 outputs the recommended value to the image forming section 109 (see FIG. 1), and the image forming section 109 prints the recommended value on paper.

As with the image acquisition section 61 and the recommended condition output section 62, the page generation section and the attribute information affixation section are implemented by the CPU 102 (see FIG. 1) by executing the program read from the ROM 103 or the like.

Figure 6:
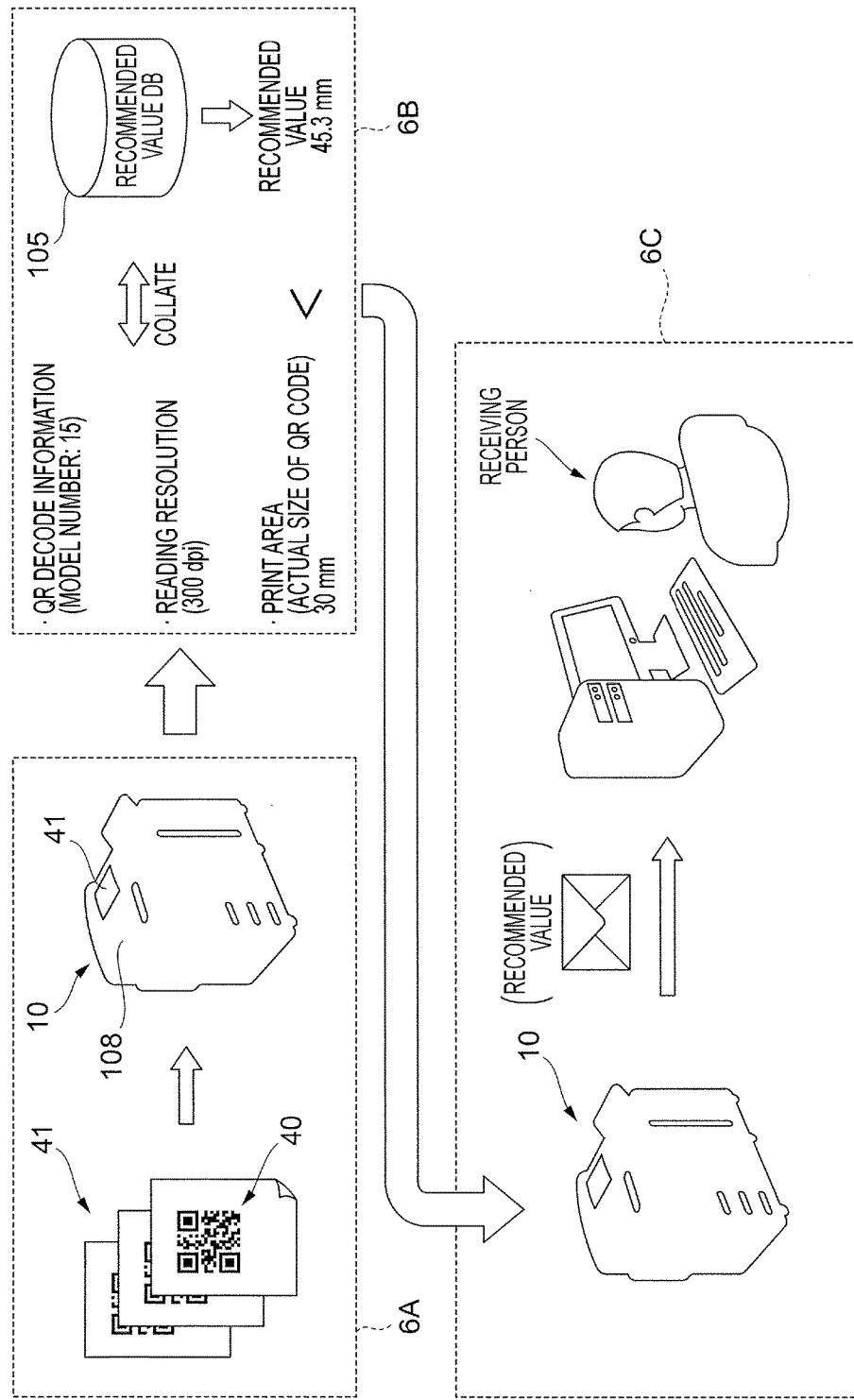
FIG. 6 illustrates another example of the process performed by the image forming apparatus.

FIG. 6 illustrates another example of the process performed by the image forming apparatus 10.

In the process example, processes indicated by symbols 6A, 6B, and 6C are executed. The processes indicated by symbols 6A and 6B are the same as the processes indicated by symbols 3A and 3B, and the process indicated by symbol 6C will be described.

In the process indicated by symbol 6C, a receiving person such as a manager is notified of the recommended value.

More specifically, in the process, the recommended value is transmitted to the receiving person using an electronic mail. The transmission is performed by the communication section 110 (see FIG. 1).

Figure 7:
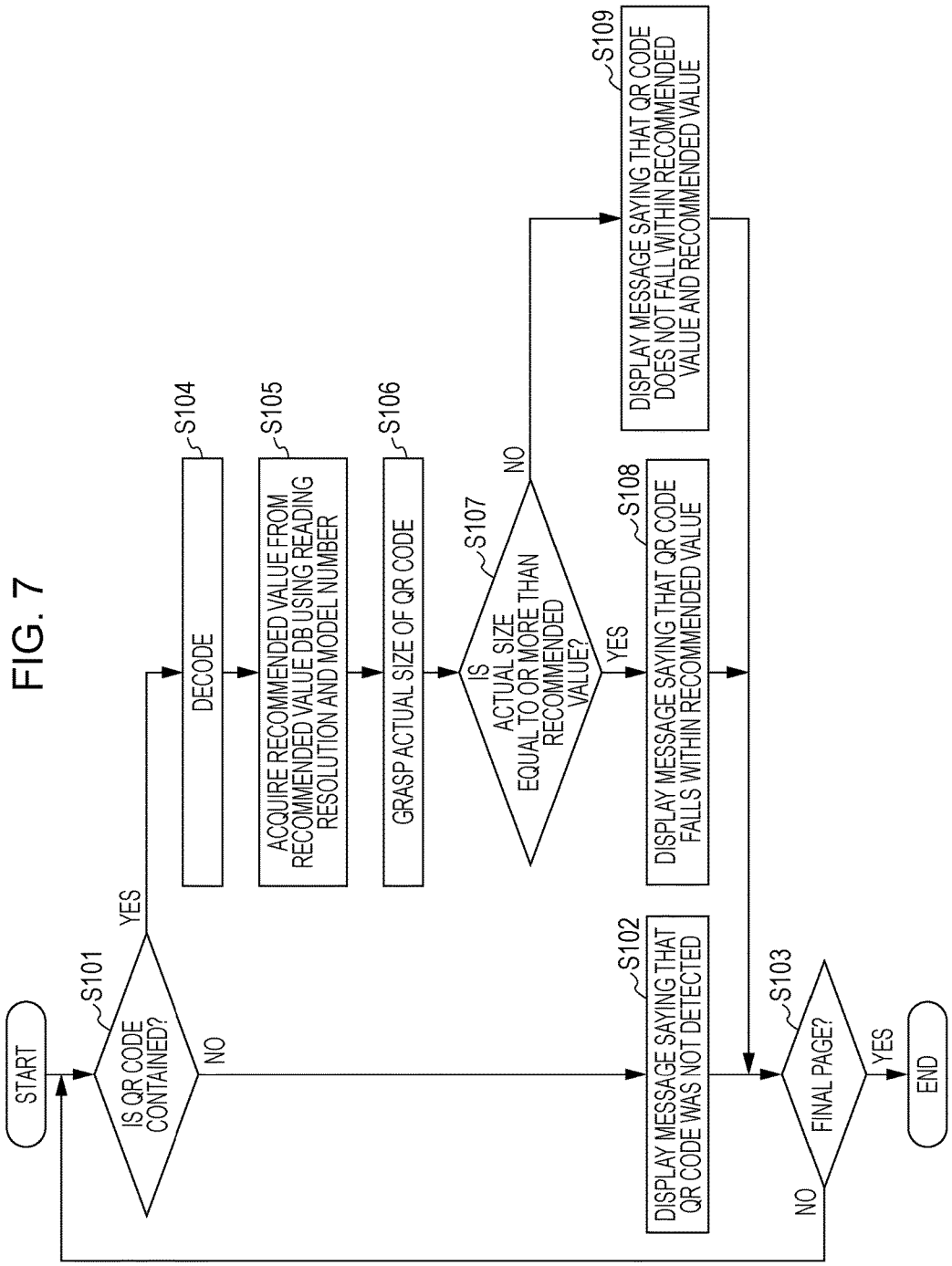
FIG. 7 is a flowchart illustrating a flow of the process performed by the image forming apparatus.

FIG. 7 is a flowchart illustrating a flow of the process performed by the image forming apparatus 10.

In the exemplary embodiment, first, the user operates the operation section 106 (see FIG. 1) to enter a code image evaluation mode exclusively for evaluating the QR code 40.

When the code image evaluation mode is entered, processes in steps S101 to S109 are executed.

In the processes, first, the document 41 is read by the image reading section 108 (see FIG. 1), and a read image is generated. The read image is output to the image acquisition section 61 (see FIG. 2), and the image acquisition section 61 acquires the read image.

Then, the recommended condition output section 62 scans the read image acquired by the image acquisition section 61, and determines whether or not the QR code 40 is contained in the read image (step S101).

In the case where it is determined in step S101 that the QR code 40 is not contained, the process proceeds to the process in step S102. In the process in step S102, the display 107 (see FIG. 1) displays a message saying that the QR code 40 was not detected.

Then, the process in step S103 is performed. In the process in step S103, it is determined whether or not the page which has been subjected to the process for detecting the QR code 40 (the page scanned to detect the QR code 40) is the final page. In the case where the scanned page is the final page, the process is ended. In the case where the scanned page is not the final page, the process in step S101 is performed again.

In the case where it is determined in step S101 that the QR code 40 is contained in the read image, on the other hand, the recommended condition output section 62 decodes the QR code 40 (step S104), and obtains the model number of the QR code 40. In addition, the recommended condition output section 62 acquires the reading resolution used to obtain the read image.

The recommended condition output section 62 acquires a recommended value for the size of the QR code 40 on the basis of the model number of the QR code 40 and the reading resolution (step S105). Specifically, a search is made through the recommended value database stored in the memory 105 to acquire a recommended value.

Next, the recommended condition output section 62 grasps the size of the QR code 40 (actual size of the QR code 40) contained in the read image (step S106). Specifically, the size of the QR code 40 (size of the print area of the QR code 40) is grasped on the basis of the X coordinate and the Y coordinate of the area in which the QR code 40 is formed.

Then, the recommended condition output section 62 determines whether or not the actual size of the QR code 40 obtained in step S106 is equal to or more than the recommended value acquired in step S105 (step S107).

In the case where the actual size of the QR code 40 is equal to or more than the recommended value, the display 107 displays a message saying that the size of the QR code 40 falls within the recommended value (a message saying that the size of the QR code 40 meets the recommended condition) (step S108).

In the case where the actual size of the QR code 40 is less than the recommended value, on the other hand, the display 107 displays a message saying that the size of the QR code 40 does not fall within the recommended value (a message saying that the size of the QR code 40 does not meet the recommended condition) (step S109). In step S109, in addition, the display 107 displays the recommended value such as "45.3 mm" as described in relation to symbol 3C in FIG. 3.

In the process in step S109, the recommended value is displayed. However, this is exemplary. Instead of displaying the recommended value, the process indicated by symbol 5C in FIG. 5 (process for generating image data for a page that indicates the recommended value) or the process indicated by symbol 5D (association of the recommended value with the read image) may be performed. The process indicated by symbol 6C in FIG. 6 (process for transmitting the recommended value) may also be performed. A process for printing the recommended value on paper may also be performed.

(Others)

In the exemplary embodiment described above, a recommended value for the QR code 40 is acquired on the basis of the model number of the QR code 40 and the reading resolution. However, a recommended value may be acquired on the basis of other information.

For example, a recommended value for the QR code 40 may be acquired on the basis of the amount of information (size of data) stored in the QR code 40, the error correction level of the QR code 40, or the like.

In the exemplary embodiment described above, a recommended value for the QR code 40 is acquired. However, a recommended condition (recommended reading condition) used when the image reading section 108 reads the document 41 (QR code 40) may be acquired.

More specifically, the reading resolution used when the image reading section 108 reads the document 41 (QR code 40) may be acquired, for example.

As seen with reference to FIG. 4, as the reading resolution is higher, the recommended value for the size of the QR code 40 is smaller. This means that the recommended condition is met when the reading resolution is increased even if the actual size of the QR code 40 is small.

More specifically, in the exemplary embodiment, the actual size of the QR code 40 is 30 mm. When the reading resolution is 300 dpi, the recommended condition is not met as described above. When the reading resolution is 600 dpi, however, the recommended value for the size of the QR code 40 is 22.7 mm, and the QR code 40 which has a size of 30 mm now meets the recommended condition for the size.

In the exemplary embodiment described above, a notification of a recommended value for the size of the QR code 40 is given so that reading is performed under a more suitable condition. In the case of the exemplary embodiment, however, reading is also performed under a more suitable condition when a notification of a reading resolution of 600 dpi is given, for example.

An additional description follows. In the exemplary embodiment described above, it is determined whether or not the size of the QR code 40 meets a predetermined condition, and a recommended value for the size is output in the case where the predetermined condition is not met.

The present invention is not limited thereto. It may be determined whether or not the reading condition used when the image reading section 108 has read the QR code 40 meets a predetermined condition, and a recommended value for the reading condition may be output in the case where the predetermined condition is not met.

A specific description will be made using the example described above. In the case where the QR code 40 with an actual size of 30 mm is read at a reading resolution of 300 dpi, it may be determined that the reading condition does not meet the predetermined condition, and a new reading resolution of 600 dpi may be output as the recommended value.

In the process described in relation to FIG. 7, a recommended value is obtained in the code image evaluation mode which is an exclusive mode. However, this is exemplary. A recommended value may be acquired to perform a process for displaying the recommended value or the like not only in an exclusive mode but also in a normal mode (in a normal scanning process for reading a document).

In the exemplary embodiment described above, the entire document 41 is read to obtain a read image of the QR code 40. However, only a portion of the document in which the QR code 40 is formed may be read to obtain a read image of the QR code 40.

In the exemplary embodiment described above, further, a recommended value is obtained in the image forming apparatus 10. However, information such as a read image and a reading resolution may be transmitted from the image forming apparatus 10 to a server device (not illustrated), for example, and a recommended value may be acquired in the server device.

In the exemplary embodiment described above, a "value" is output as the recommended condition. However, information other than a value may be output as the recommended condition.

In the exemplary embodiment described above, one of a recommended formation condition (condition such as the size), which is a recommended condition used when the QR code 40 is formed on the document 41, and a recommended reading condition (condition such as the reading resolution), which is a recommended condition used when the image reading section 108 reads a portion in which the QR code 40 is formed, is output. However, both the recommended formation condition and the recommended reading condition may be output.

In the foregoing description, the process for displaying the recommended formation condition, the process for generating image data for a page that indicates the recommended formation condition, the process for printing the recommended formation condition on paper, association of the recommended formation condition with the read image, and the process for transmitting the recommended formation condition have been described. Such processes may be performed not only for the recommended formation condition but also for the recommended reading condition. Alternatively, such processes may be performed for both the recommended formation condition and the recommended reading condition.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor that performs the functions of:
   an acquisition unit that acquires a read image obtained by an image reading unit by reading at least a formation portion of a document to which a code image has been affixed, the code image being formed in the formation portion; and an output unit that: (i) performs an analysis of the code image; (ii) based on the analysis of the code image, obtains a model number of the code image; (iii) obtains a reading resolution used when the image reading unit reads the formation portion; and (iv) outputs at least one of a recommended formation condition, which is a recommended condition used when the code image is formed on the document, and a recommended reading condition, which is a recommended condition used when the image reading unit reads the formation portion, wherein the output unit determines whether or not the code image meets a predetermined condition based on the model number obtained from the code image and a size of the code image, and outputs the recommended formation condition when the predetermined condition is not met.

2. The information processing apparatus according to claim 1, wherein the output unit outputs a condition about a size of the code image as the recommended formation condition.

3. The information processing apparatus according to claim 1, wherein the output unit outputs the recommended reading condition in a case where a reading condition used when the image reading unit has read the formation portion does not meet a predetermined condition.

4. The information processing apparatus according to claim 1, wherein the output unit outputs a reading resolution used when the image reading unit reads the formation portion as the recommended reading condition.

5. The information processing apparatus according to claim 1, wherein the processor performs any one process of displaying at least one recommended condition among the recommended formation condition and the recommended reading condition output from the output unit, generating image data for a page that indicates the at least one recommended condition, printing the at least one recommended condition on paper, associating the at least one recommended condition with the read image, and transmitting the at least one recommended condition.

6. An image reading apparatus comprising:

an image reading unit that reads a document to which a code image has been affixed; and a processor that performs the function of an output unit that: (i) performs an analysis of the code image; (ii) based on the analysis of the code image, obtains a model number of the code image; (iii) obtains a reading resolution used when the image reading unit reads the formation portion; and (iv) outputs at least one of a recommended formation condition, which is a recommended condition used when the code image is formed on the document, and a recommended reading condition, which is a recommended condition used when the image reading unit reads the document, wherein the output unit determines whether or not the code image meets a predetermined condition based on the model number obtained from the code image and a size of the code image, and outputs the recommended formation condition when the predetermined condition is not met.

7. An information processing method comprising:

acquiring, with a processor, a read image obtained by an image reading unit by reading at least a formation portion of a document, to which a code image has been affixed, in which the code image is formed;

performing, with the processor, an analysis of the code image;

based on the analysis of the code image, obtaining, with the processor, a model number of the code image;

obtaining, with the processor, a reading resolution used when the image reading unit reads the formation portion;

outputting, with the processor, at least one of a recommended formation condition, which is a recommended condition used when the code image is formed on the document, and a recommended reading condition, which is a recommended condition used when the image reading unit reads the formation portion;

determining, with the processor, whether or not the code image meets a predetermined condition based on the model number obtained from the code image and a size of the code image; and outputting, with the processor, the recommended formation condition when the predetermined condition is not met.

8. A non-transitory computer readable medium storing a program causing a computer to perform a process comprising:

acquiring a read image obtained by an image reading unit by reading at least a formation portion of a document, to which a code image has been affixed, in which the code image is formed;

performing an analysis of the code image;

based on the analysis of the code image, obtaining a model number of the code image;

obtaining a reading resolution used when the image reading unit reads the formation portion;

outputting at least one of a recommended formation condition, which is a recommended condition used when the code image is formed on the document, and a recommended reading condition, which is a recommended condition used when the image reading unit reads the formation portion;

determining whether or not the code image meets a predetermined condition based on the model number obtained from the code image and a size of the code image; and outputting the recommended formation condition when the predetermined condition is not met.

9. The information processing apparatus according to claim 1, wherein the message further comprises instructions to a user as to how to change at least one of a current formation condition and a current reading condition to improve formation of the code image.

10. The information processing apparatus according to claim 1, wherein the recommended condition is not included in the code image.

* * * * *